United States Patent [19]
Ahn

[11] Patent Number: 5,839,153
[45] Date of Patent: Nov. 24, 1998

[54] WINDSHIELD WIPER SYSTEM FOR VEHICLES

[75] Inventor: Sungchul Ahn, Ansan, Rep. of Korea

[73] Assignee: Hyundai Motor Company, Seoul, Rep. of Korea

[21] Appl. No.: 773,940

[22] Filed: Dec. 30, 1996

[30] Foreign Application Priority Data

Dec. 28, 1995 [KR] Rep. of Korea .................. 1995-61918

[51] Int. Cl.⁶ ........................................................ B60S 1/46
[52] U.S. Cl. ........................... 15/250.02; 239/284.1; 239/586
[58] Field of Search ................ 15/250.02, 250.04, 15/250.01, 250.03; 239/284.1, 284.2, 586

[56] References Cited

U.S. PATENT DOCUMENTS

| | | | |
|---|---|---|---|
| 3,454,977 | 7/1969 | Ziegler | 15/250.02 |
| 3,703,017 | 11/1972 | Edwards | 15/250.02 |
| 4,285,089 | 8/1981 | Takahashi et al. | 15/250.02 |
| 4,393,341 | 7/1983 | Byrne | 15/250.02 |
| 4,922,570 | 5/1990 | Hirohama et al. | 15/250.02 |
| 5,327,613 | 7/1994 | Ohtsu | 15/250.02 |

FOREIGN PATENT DOCUMENTS

| | | | |
|---|---|---|---|
| 4238 | 1/1980 | Japan | 15/250.02 |
| 164652 | 6/1990 | Japan | 15/250.02 |

*Primary Examiner*—Gary K. Graham
*Attorney, Agent, or Firm*—Christie, Parker & Hale, LLP

[57] ABSTRACT

A windshield wiper system for improving the cleaning operation of the windshield wiper. The system includes a wiper motor, a wiper arm, and a link means for converting the rotary power of the motor into wiper arm movement on a windshield. The washer fluid is pumped from a reserve tank at a predetermined pressure by a pump. A washer fluid control part uses washer fluid interrupters for injecting washer fluid on the windshield in front of the wiper arms.

11 Claims, 6 Drawing Sheets

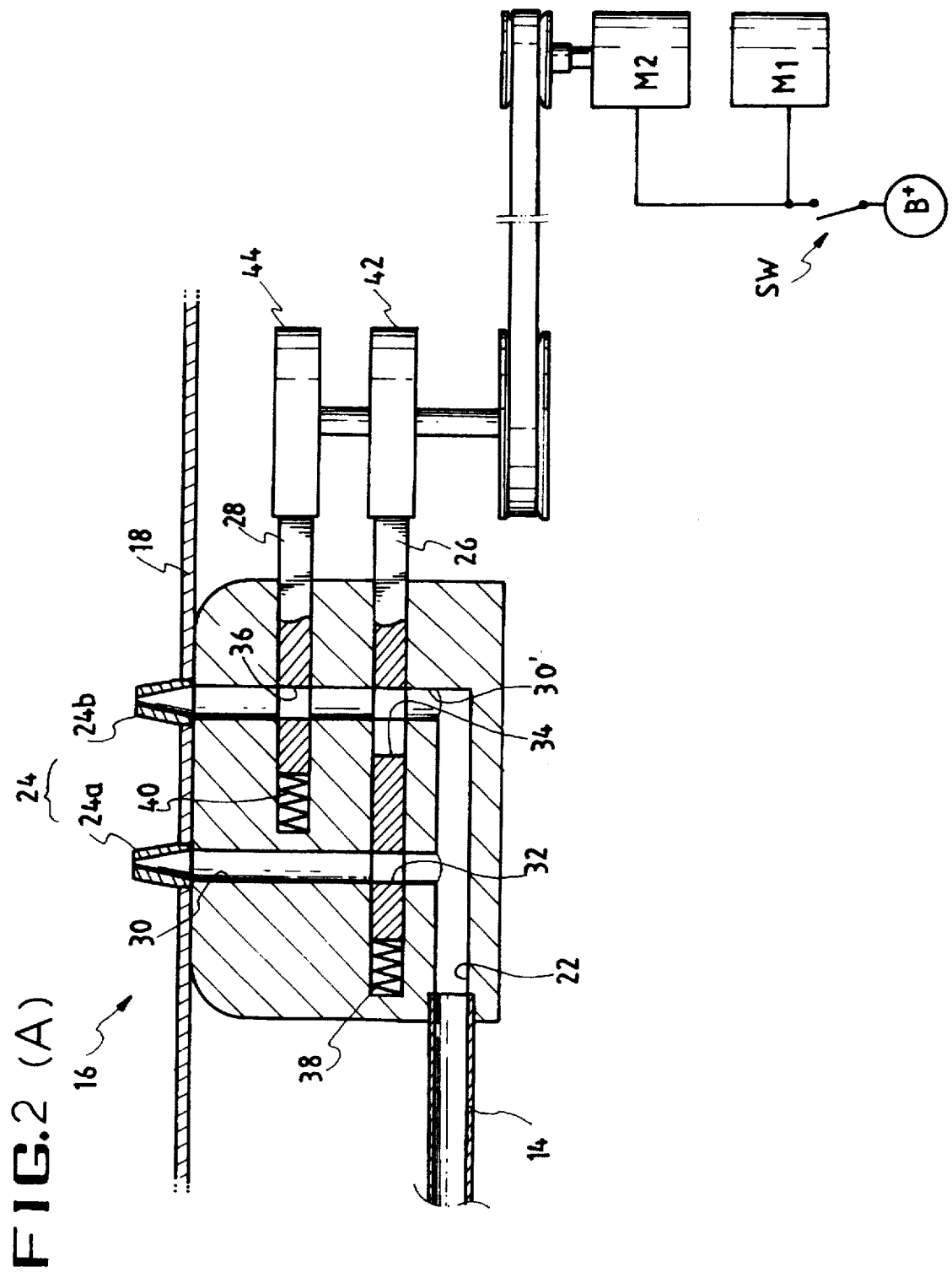

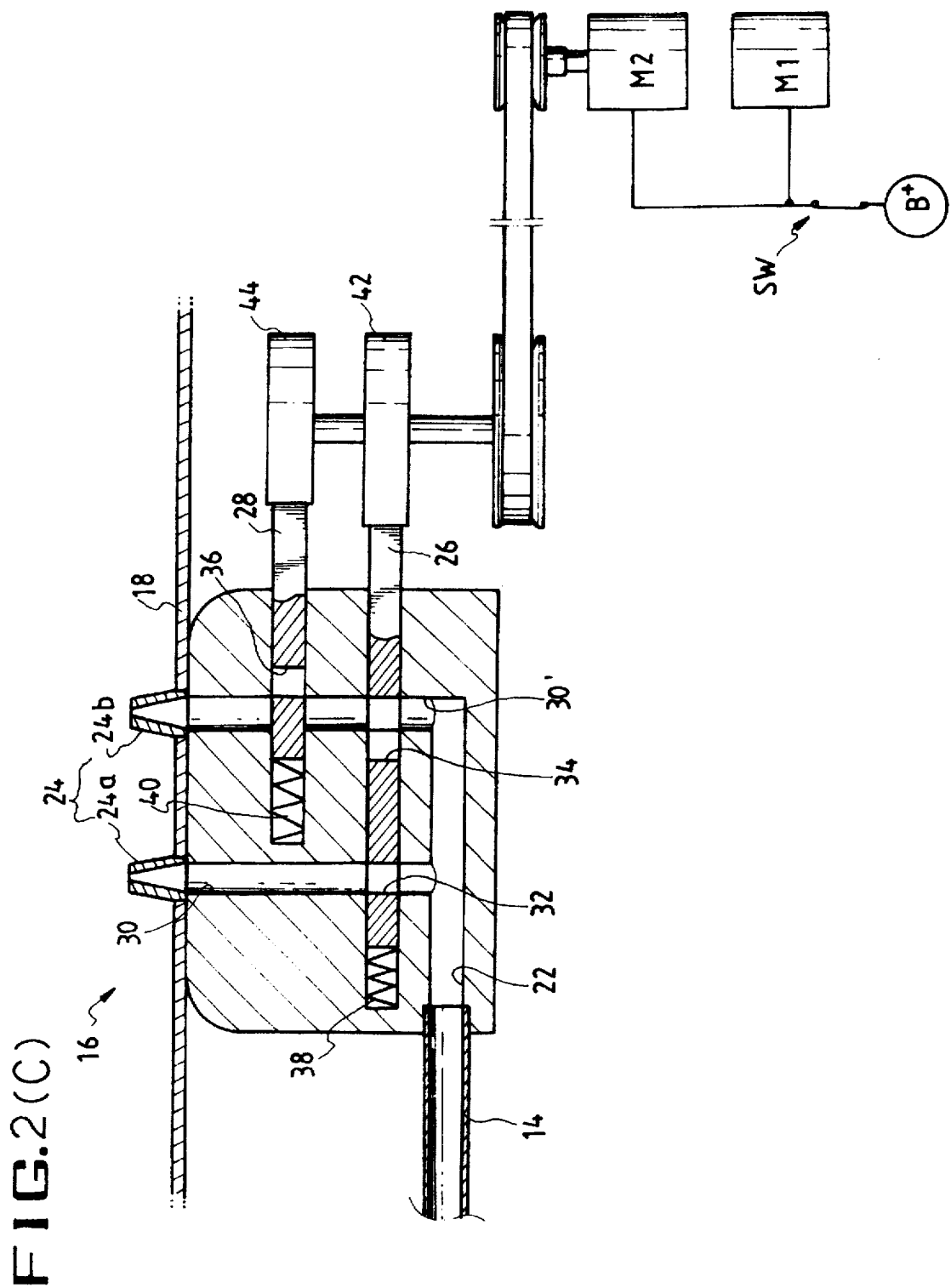

5,839,153

WINDSHIELD WIPER SYSTEM FOR VEHICLES

FIELD OF THE INVENTION

The present invention relates to a windshield wiper system for vehicles. More particularly, the present invention relates to a windshield wiper system for vehicles which improves the cleaning operation of the windshield wiper system by controlling the position and timing of washer fluid injection.

BACKGROUND OF THE INVENTION

A windshield wiper system is provided on a windshield in a vehicle to clear the windshield of rain and to remove dust, dirt, etc. from the windshield.

The windshield wiper system uses a wiper motor to operate a wiper arm by means of linkages connected to the wiper motor through a cam.

The wiper arm is mounted with a blade which cleans dust and other substances on the windshield. The windshield can be better cleaned by injecting a washer fluid thereon to facilitate the easy removal of these substances blocking the driver's view out of the front of the vehicle.

To facilitate the above, a washer fluid injecting means is provided which includes a reserve tank that stores the washer fluid, a pump that pumps the washer fluid in the reserve tank, a hose which guides the pumped washer fluid onto the windshield, and a nozzle which directly injects the washer fluid on the windshield.

However, the wiper system with the above structure has a disadvantage in that the washer fluid is sprayed on the windshield on a location already passed over by the wiper blades or on the wiper arm, making the injection position and timing ineffective.

SUMMARY OF THE INVENTION

Accordingly, an object of an embodiment of the present invention is to provide a windshield wiper system for vehicles which optimizes the cleaning operation of the wiper system by means of controlling the position and timing of washer fluid injection.

A windshield wiper system for vehicles in accordance with an embodiment of the present invention includes a wiper motor to operate a wiper arm for wiping the windshield of the vehicle. Pressurized fluid is injected by a nozzle to facilitate the cleaning operation. The system includes means for controlling the washer fluid injection timing in accordance with the movement of the wiper arm, such that the washer fluid can be injected in front of the movement of the wiper arm.

The means for controlling the washer fluid injection preferably includes a washer fluid control motor operating by battery power, a nozzle body having a passage connected to the nozzle, a washer fluid interrupter for selectively opening and closing the passage leading to the nozzle, and means for converting the rotary power of the washer fluid control motor into a rectilinear movement of the washer fluid interrupter so that the washer fluid interrupter can open and close the passage.

The means for converting preferably includes a power transmitting belt, which transmits rotary power from a drive shaft of the control motor to a cam shaft. The cam shaft has a cam in contact with the washer fluid interrupter.

Additional objects and advantages of the invention are set forth in part in the description which follows, and in part will be apparent from the description, or may be learned by practice of the invention. The objects and advantages of the invention will be realized and attained by means of the elements and combinations particularly pointed out in the appended claims.

DESCRIPTION OF THE DRAWINGS

Further objects and other advantages of the present invention will become apparent from the following description together with the attached drawings, in which:

FIGS. 2A, 2B and 2C are side sectional views illustrating a structure of a wiper system according to an embodiment of the present invention;

DETAILED DESCRIPTION OF THE INVENTION

Reference will now be made in detail to a preferred embodiment of the present invention, an example of which is illustrated in the accompanying drawings.

Figure 1:
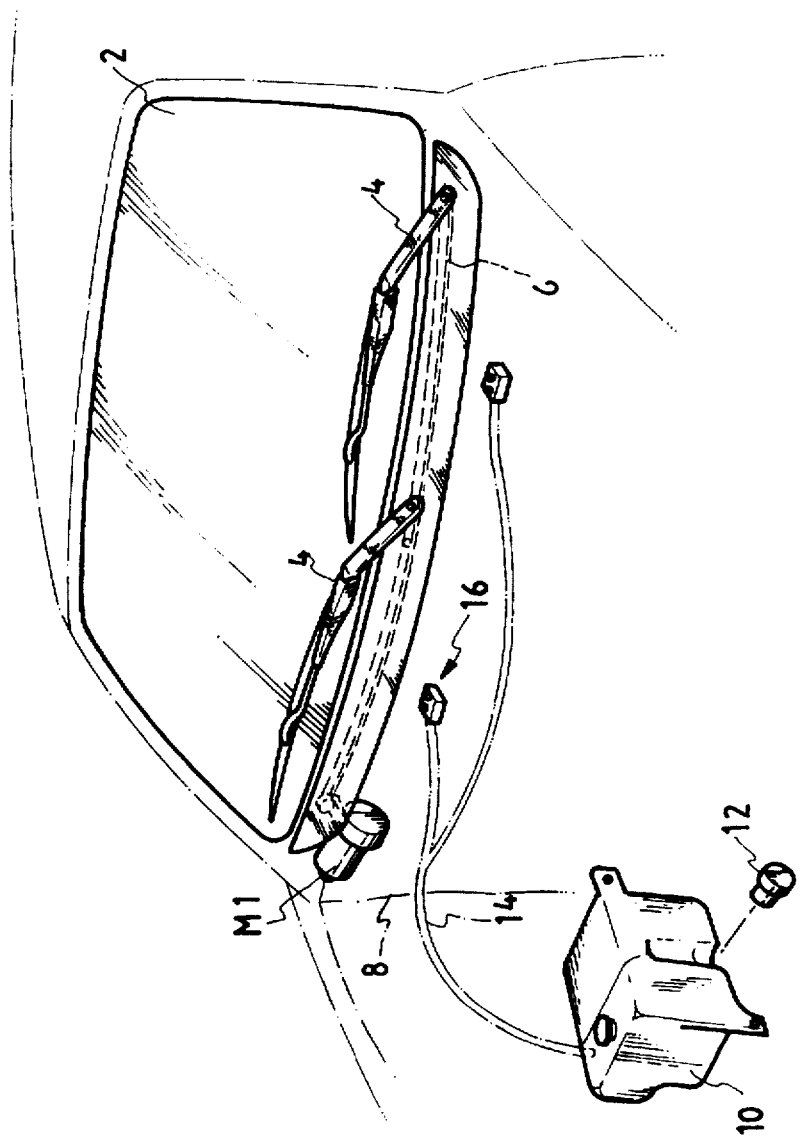
FIG. 1 is a view schematically showing a wiper system used in vehicles according to an embodiment of the present invention.
Figure 2B:
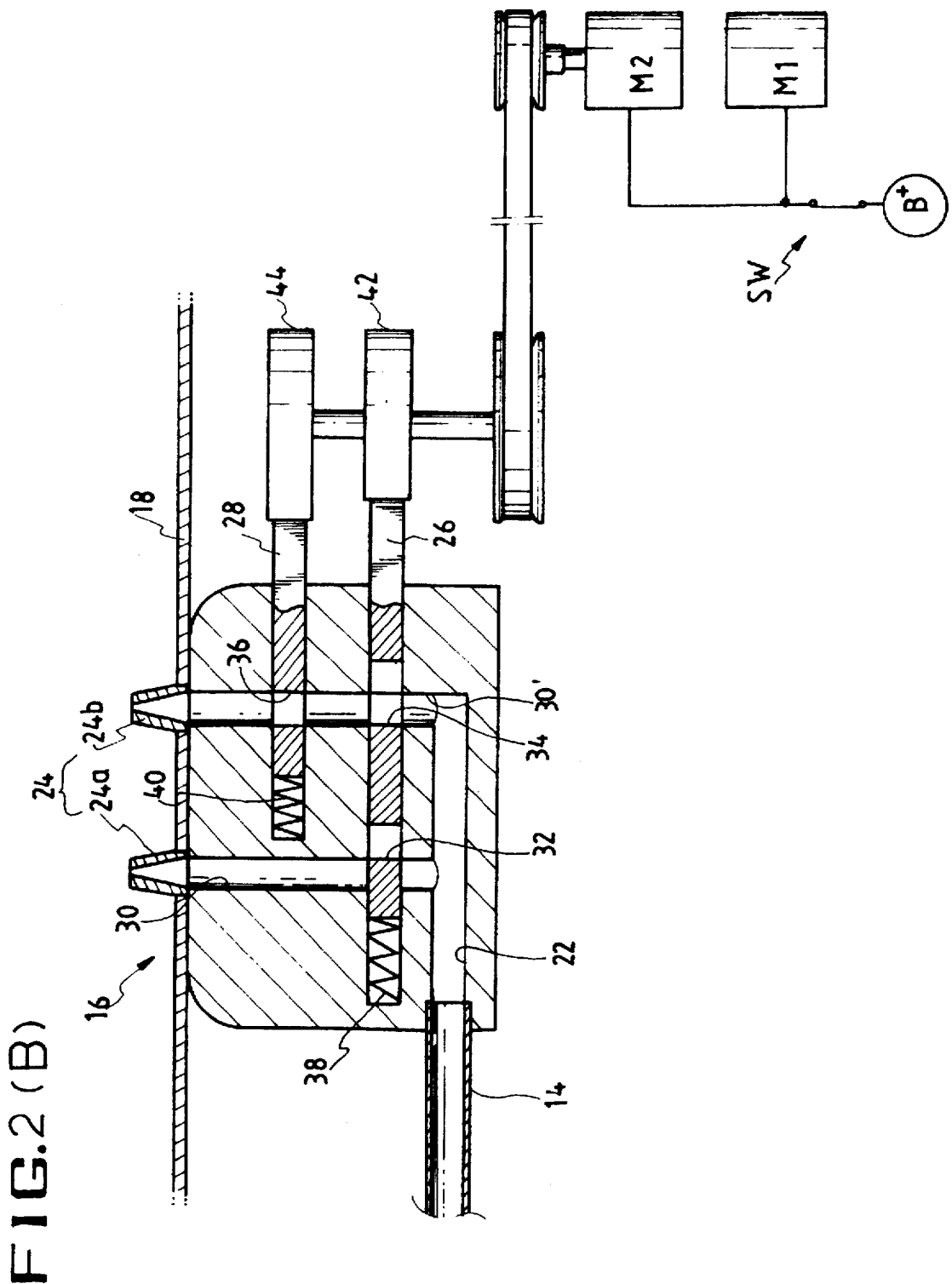

FIG. 1 is a view schematically showing a wiper system used in vehicles according to an embodiment of the present invention, and FIGS. 2A, 2B and 2C are side sectional views illustrating the structure of the wiper system for this embodiment. Reference numeral 2 in the drawings refers to a windshield.

As shown in FIG. 1 and FIGS. 2A, 2B and 2C, wiper arms 4 are positioned at the bottom of the windshield 2 and are connected to a cam (not shown) on a drive shaft of a wiper motor M1 by means of linkages 6 to allow the wiper arms to be driven by the wiper motor M1.

As the drive structure and operation of the wiper arms 4 are similar to that of the prior art, an explanation thereof will be omitted in this specification.

The wiper motor M1 is fixedly attached in an engine compartment 8 inside of which is also provided means for supplying washer fluid. The means for supplying washer fluid operates together with the wiper arms 4.

The means for supplying washer fluid includes a reserve tank 10 containing washer fluid, a pump 12 which is connected to the reserve tank 10 and pumps washer fluid when a driver activates an on/off switch (not shown), a hose 14 which is connected to an outlet of the reserve tank 10 and directs the pumped washer fluid, and a washer fluid control part 16 which is connected to the hose 14 and injects washer fluid on the windshield 2 in accordance with the position of the wiper arms 4.

The washer fluid control part 16 consists of a nozzle body 20 mounted under the hood 18 of the vehicle, and a nozzle 24 fixed to the nozzle body 20 communicating with a passage 22 formed in the nozzle body 20.

The passage 22 formed in the nozzle body 20 communicates with the hose 14 so that the washer fluid can be fed to the nozzle 24. There are also provided lower and upper washer fluid interrupters 26 and 28 on the horizontal passage 22 which supply or delay the supply of washer fluid according to the position of the wiper arms 4.

The lower washer fluid interrupter 26 is provided in the nozzle body 20 to selectively open and close vertical passages 30 and 30', which communicate with the horizontal passage 22, by undergoing a rectilinear movement.

In the preferred embodiment, although there are shown a plurality of nozzles 24, it is possible for there to only be one nozzle. The number of the washer fluid interrupters 26 and 28, however, preferably corresponds to the number of nozzles.

The lower washer fluid interrupter 26, on which holes 32 and 34 are formed thereon, opens both the vertical passages 30 and 30' to the horizontal passage 22, and the other washer fluid interrupter 28, on which a hole 36 is formed thereon, opens only one of the vertical passages 30'.

The lower and upper washer fluid interrupters 26 and 28 are elastically supported by elastic members 38 and 40 on one end thereof, and on the other side, the interrupters 26 and 28 are in constant contact with an outer circumferential surface of lower and upper cams 42 and 44.

The lower and upper cams 42 and 44 make the lower and upper washer fluid interrupters 26 and 28 move back and forth so that the lower and upper washer fluid interrupters 26 and 28 selectively open and close the passages 30 and 30' formed in the nozzle body 20. The lower and upper cams 42 and 44 are connected to a cam shaft 41. Preferably, rotary power from a drive shaft 45 of a washer fluid control motor M2 is coupled to the cam shaft via a drive belt 43. The use of the drive belt helps to reduce the generation of noise.

When the lower and upper cams 42 and 44 are rotated by the washer fluid control motor M2, the lower and upper washer fluid interrupters 26 and 28 repeat a back and forth movement according to a circumference of the lower and upper cams 42 and 44.

Figure 3:
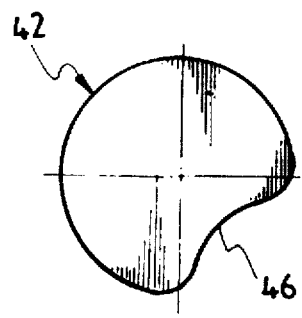
FIGS. 3A and 3B are front views of a cam used in an embodiment of the present invention.
Figure 3:
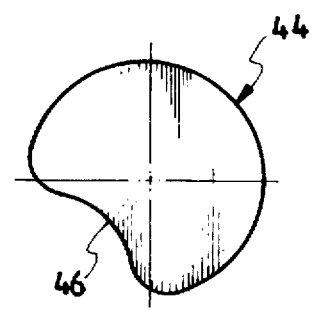

As shown in FIG. 3, a groove 46 is formed on a quarter portion of both the lower and upper cams 42 and 44 and, accordingly, the lower and upper washer fluid interrupters 26 and 28 move as much as the depth of the groove 46.

The shape of the lower and upper cams 42 and 44 are identical with each other, but, a positioning of the grooves 46 differs from each other.

Each position of the grooves 46 on the cams 42 and 44 with respect to the position of the drive shaft of the washer fluid control motor M2 are shown in FIGS. 3A and 3B.

The washer fluid control motor M2 is connected to the wiper motor M1 through a battery B, and is activated when the wiper motor M1 is activated.

Through the above, the lower and upper washer fluid interrupters 26 and 28 move back and forth during the wiping action of the wiper arms 4.

According to an embodiment of the present invention, the wiper motor M1 and washer fluid control motor M2 simultaneously operate when the switch is turned on.

Correspondingly, the wiper motor M1 operates the wiper arms 4 which clean the windshield 2, while the washer fluid control motor M2 rotates the lower and upper cams 42 and 44.

The lower and upper washer fluid interrupters 26 and 28, which are in contact with the outer circumference of the lower and upper cams 42 and 44, move back and forth according to the movement line of the cams 42 and 44 when they begin to rotate, wherein the washer fluid in the reserve tank 10 is pumped by the washer fluid activating pump 12 and through to the washer fluid injection control part 16.

The washer fluid in the hose 14 is injected through one of the nozzles 24a and 24b or all of the nozzles by the operation of the washer fluid injection control part 16.

Figure 5:
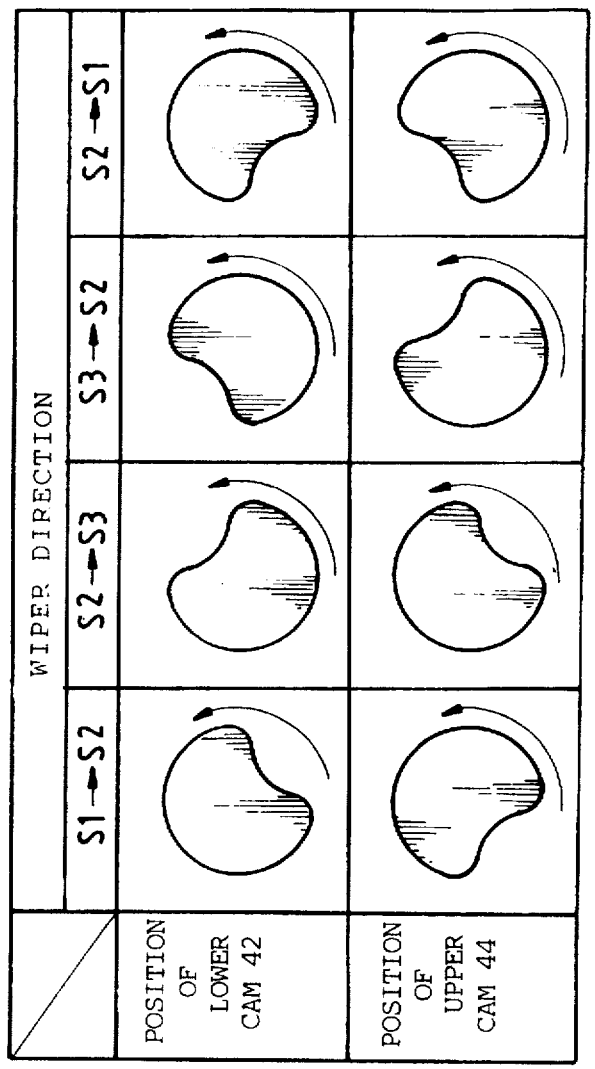
FIG. 5 is a view for explaining changes of positions, according to a drive motor, of a cam according to an embodiment of the present invention.

The selective injection of the nozzles is carried out according to the position of the cams 42 and 44 as shown in FIG. 5.

The change of position of the lower and upper cams 42 and 44 as shown in FIG. 5 is realized through the operation of the washer fluid control motor M2. The lower and upper cams 42 and 44 are in constant contact with the washer fluid interrupters 26 and 28 regardless of their rotational positioning.

Figure 4:
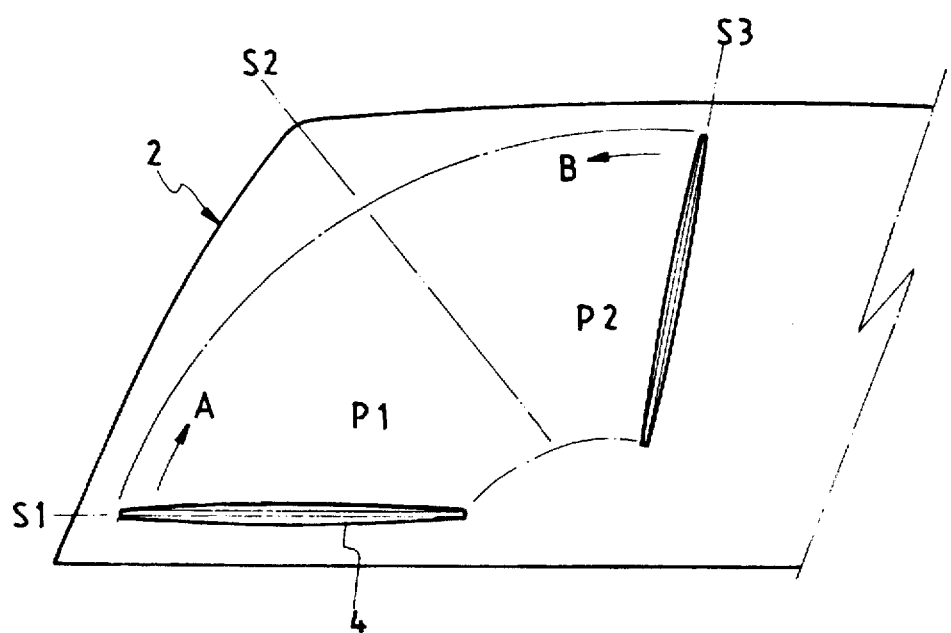
FIG. 4 is a view showing an injection position of washer fluid according to an embodiment of the present invention.

S1, S2 and S3 appearing in FIGS. 4 and 5 indicate different positions of the wiper arms 4 on the windshield 2.

Namely, S1 indicates a point in which the wiper arms 4 begin to operate from a non-operating position, S2 indicates the middle point of the operation of the wiper arms 4, and S3 indicates a turning position from which the wiper arms 4 turn back.

For the purpose of simplifying the explanation, S1 will be referred to as an initial position, S2 as a middle position, and S3 as a turning position.

At the moment the wiper arms 4 start their operation from the initial position S1, the lower and upper cams 42 and 44 are positioned as shown in FIG. 5.

When the lower and upper cams 42 and 44 rotate counterclockwise, such that the groove 46 of the lower cam 42 is on the fourth quadrant and the groove 46 of the upper cam 44 is on the third quadrant, the washer fluid interrupters 26 and 28 are kept in constant contact with the outside circumferential surface of the lower and upper cams 42 and 44 by the elastic force of the elastic members 38 and 40.

When the wiper arms 42 and 44 start their movement from the initial position S1 to the middle position S2, as the holes 32, 34 and 36 formed on the washer fluid interrupters 26 and 28 communicate with the vertical passages 30, the washer fluid is simultaneously injected through the nozzles 24 as shown in FIG. 2A.

Accordingly, the washer fluid is injected at the positions P1 and P2, as shown in FIG. 4, on the windshield 2.

After the above injection, the lower and upper cams 42 and 44 further rotate to the position shown in the second column of FIG. 5 where the wiper arms 4 are passing the middle position S2 of FIG. 4.

Accordingly, when the wiper arms 4 move from the middle position S2 to the turning position S3, the lower washer fluid interrupter 26 connected to the lower cam 42 moves according to the position shown in FIG. 2B. Once again, the elasticity of the elastic member 38 keeps the washer fluid interrupter 26 in close contact with the cam 42.

Therefore, since the hole 32 formed on the lower washer fluid interrupter 26 is not lined up with the vertical passage 30, the washer fluid can only be injected through the nozzle 24b, corresponding to the position P2 on the windshield 2 in FIG. 4.

After the above, the wiper arms 4 finish moving to the turning position S3 and start moving back to the middle position S2. The lower and upper cams 42 and 44 further rotate to the position shown in FIG. 5.

Since the washer fluid interrupters 26 and 28 are kept in constant contact with the circumference of the cams 42 and 44, the washer fluid can be injected through both nozzles 24 as when the wiper arms 4 move from the initial position S1 to the middle position S2.

When the wiper arms 4 start moving from the middle position S2 to the initial position S1, the lower and upper cams 42 and 44 further rotate to the position shown in the fourth column of FIG. 5.

Accordingly, as the upper washer fluid interrupter 28 makes contact with the groove 46 of the upper cam 44, the upper washer fluid interrupter 28 blocks the vertical passage 30' connected to the nozzle 24b, thereby obstructing the injection of washer fluid.

Here, the washer fluid can only be injected to the position P1 on the windshield through the nozzle 24a through the positioning of the lower and upper washer fluid interrupters 26 and 28 shown in FIG. 2C.

As described above, a windshield wiper system for vehicles according to an embodiment of the present invention can improve the cleaning of the windshield by using a method in which the washer fluid is injected in front of the wiper arms.

Also, the windshield wiper system of the present invention can reduce the amount of the washer fluid scattering into the air while driving by increasing injection pressure of the washer fluid when the washer fluid interrupters close the passages leading to the nozzles of the washer fluid system.

Finally, an embodiment of the present invention can essentially reduce the amount of washer fluid lost since the washer fluid is injected on the surface of the windshield only in front of the wiper arms.

While this invention has been described in connection with what is presently considered to be the most practical and preferred embodiment, it is to be understood that the invention is not limited to the disclosed embodiments, but, on the contrary, it is intended to cover various modifications and equivalent arrangements included within the spirit and scope of the appended claims.

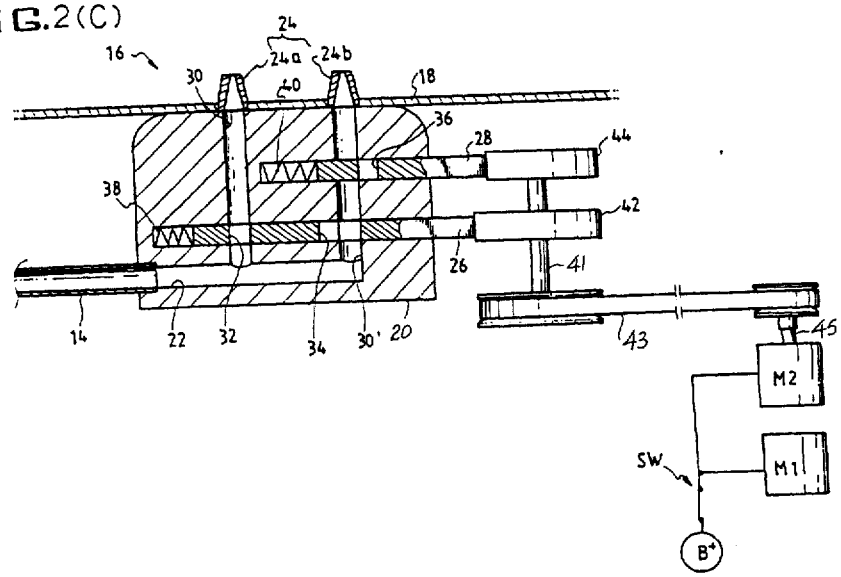

I claim:

1. A windshield wiper system which controls the injection of washer fluid onto a windshield in accordance with movement of a wiper arm, comprising:

a wiper motor having a rotary power output;

means for wiping a windshield by receiving the rotary power from the wiper motor, said wiping means including a wiper arm;

means for injecting washer fluid on the windshield, said injection means including a nozzle through which pressurized fluid is injected and;

means for controlling the timing of injection of washer fluid on the windshield comprising, a washer fluid control motor operated concurrently with the wiper motor and having a rotary power output, said fluid control motor adapted to be operated by battery power, a nozzle body having a passage connected to the nozzle, a washer fluid interrupter for selectively opening and closing the passage leading to the nozzle, and means for converting the rotary power of the washer fluid control motor into a rectilinear movement of the washer fluid interrupter so that the washer fluid interrupter can open and close the passage according to the rectilinear movement of the washer fluid interrupter.

2. The windshield wiper system according to claim 1 wherein the control motor output comprises a drive shaft, and the converting means, comprises:

a cam shaft;

a power transmitting belt for transmitting the rotary power of the drive shaft to the cam shaft; and a cam positioned on the cam shaft and in contact with the washer fluid interrupter.

3. The windshield wiper system according to claim 1 wherein the washer fluid interrupter comprises a hole for allowing washer fluid to pass through the passage formed in the nozzle body.

4. The windshield wiper according to claim 1 further comprising a plurality of washer fluid interrupters, and a corresponding plurality of nozzles such that the open and close operation of each nozzle can be independently performed by its respective fluid interrupter, thereby selectively injecting fluid through each of the nozzles.

5. A windshield wiper system which controls the injection of washer fluid onto a windshield in accordance with movement of a wiper arm, comprising:

a wiper motor having a rotary power output;

a wiper arm for wiping the windshield;

link means for converting the rotary power output of the wiper motor into a wiping movement of the wiper arm;

a pump for pumping washer fluid from a reserve tank at a predetermined pressure; and a washer fluid control part comprising, a nozzle for injecting washer fluid pumped by the pump on an outside surface of the windshield, a nozzle body having a passage for directing the washer fluid into the nozzle, a washer fluid interrupter, and a cam actuator for moving the washer fluid interrupter back and forth so that the washer fluid interrupter can selectively open and close the passage formed in the nozzle body, said cam actuator being operated concurrently with the wiper motor.

6. The windshield wiper system according, to claim 5 further comprising a plurality of washer fluid interrupters, and a plurality of corresponding elastic members, each of the fluid interrupters being elastically supported by its respective elastic member in the nozzle body so as to give resistance to movement of the cam actuator.

7. The windshield wiper system according to claim 5 wherein the washer fluid interrupter comprises a hole for effusing the washer fluid.

8. The windshield wiper system according to claim 5 wherein the cam actuator comprises:

a cam positioned in contact with the washer fluid interrupter;

a control motor having a rotary power output; and a power transmitting belt for transmitting the rotary power of the control motor to the cam.

9. A system for injecting washer fluid on a windshield in accordance with movement of a wiper arm, comprising:

a wiper arm operable for wiping the windshield; and a washer fluid controller for injecting washer fluid on the windshield, said controller being operated concurrently with the wiper arm, said washer fluid controller comprising;

a nozzle for injecting washer fluid on the windshield, a nozzle body having a passage for directing washer fluid into the nozzle, and a washer fluid interrupter transversing the passage of the nozzle body, said interrupter being moveable in a rectilinear motion for opening and closing the passage.

10. The system of claim 9 wherein said washer fluid controller further comprises a cam actuator for moving the washer fluid interrupter in said rectilinear motion.

11. The system of claim 10 wherein said cam actuator comprises:

a cam positioned in contact with the washer fluid interrupter;

a control motor having a rotary output; and means for transmitting the rotary output of the control motor to the cam.

* * * * *

UNITED STATES PATENT AND TRADEMARK OFFICE
CERTIFICATE OF CORRECTION

PATENT : 5,839,153

DATED : November 34, 1998

INVENTOR(S) : Sung-Chul Ahn

It is certified that error appears in the above-identified patent and that said Letters Patent is hereby corrected as shown below:

On the title page, item [75], the Inventor should read:
--Sung-Chul Ahn, Kyungki-do, Rep. of Korea--.

The title page, showing an illustrative figure, should be deleted and substituted therefor the attached title page.

Signed and Sealed this

Twentieth Day of March, 2001

*Attest:*

NICHOLAS P. GODICI

*Attesting Officer*   *Acting Director of the United States Patent and Trademark Office*

United States Patent
Ahn

Patent Number: 5,839,153
Date of Patent: Nov. 24, 1998

[54] WINDSHIELD WIPER SYSTEM FOR VEHICLES

[75] Inventor: Sungchul Ahn, Ansan, Rep. of Korea

[73] Assignee: Hyundai Motor Company, Seoul, Rep. of Korea

[21] Appl. No.: 773,940

[22] Filed: Dec. 30, 1996

[30] Foreign Application Priority Data

Dec. 28, 1995 [KR] Rep. of Korea ............... 1995-61918

[51] Int. Cl.[6] .................................................. B60S 1/46
[52] U.S. Cl. ............................ 15/250.02; 239/284.1; 239/586
[58] Field of Search ..................... 15/250.02, 250.04, 15/250.01, 250.03; 239/284.1, 284.2, 586

[56] References Cited

U.S. PATENT DOCUMENTS

| | | |
|---|---|---|
| 3,454,977 | 7/1969 | Ziegler .................. 15/250.02 |
| 3,703,017 | 11/1972 | Edwards ................. 15/250.02 |
| 4,285,089 | 8/1981 | Takahashi et al. ....... 15/250.02 |
| 4,393,341 | 7/1983 | Byrne .................... 15/250.02 |
| 4,922,570 | 5/1990 | Hirohama et al. ....... 15/250.02 |
| 5,327,613 | 7/1994 | Ohtsu ................... 15/250.02 |

FOREIGN PATENT DOCUMENTS

| | | | |
|---|---|---|---|
| 4238 | 1/1980 | Japan .................. 15/250.02 |
| 164652 | 6/1990 | Japan .................. 15/250.02 |

*Primary Examiner*—Gary K. Graham
*Attorney, Agent, or Firm*—Christie, Parker & Hale, LLP

[57] ABSTRACT

A windshield wiper system for improving the cleaning operation of the windshield wiper. The system includes a wiper motor, a wiper arm, and a link means for converting the rotary power of the motor into wiper arm movement on a windshield. The washer fluid is pumped from a reserve tank at a predetermined pressure by a pump. A washer fluid control part uses washer fluid interrupters for injecting washer fluid on the windshield in front of the wiper arms.

11 Claims, 6 Drawing Sheets

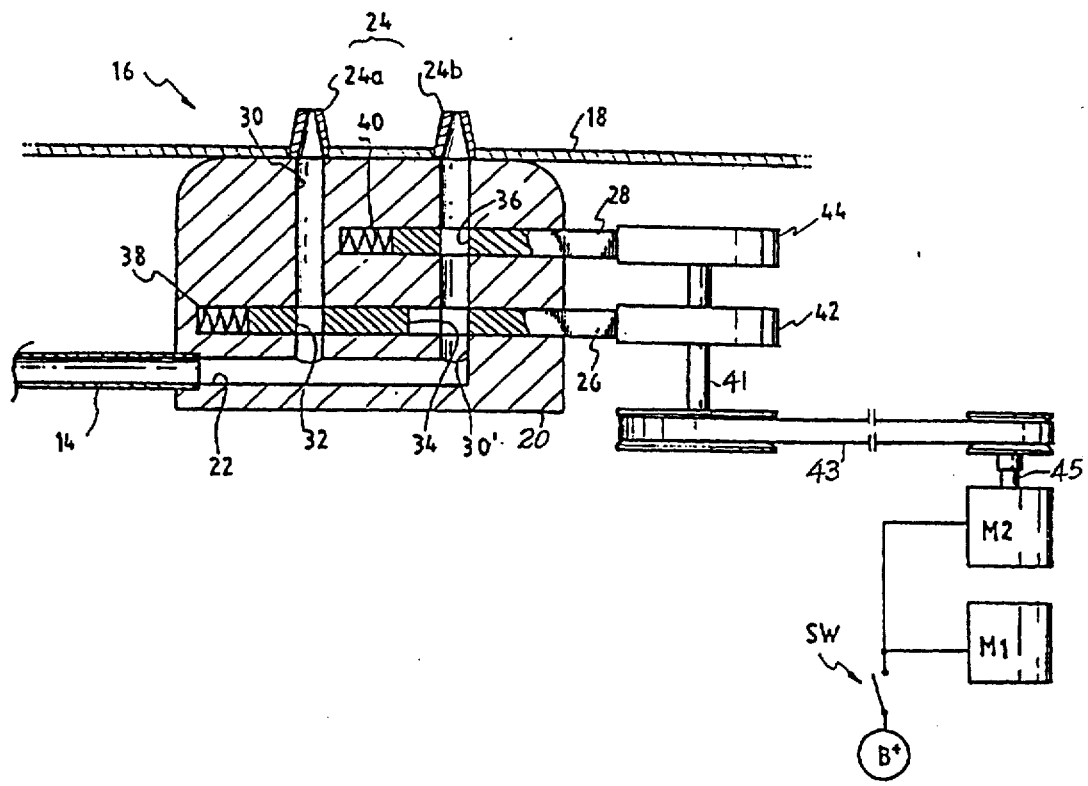

UNITED STATES PATENT AND TRADEMARK OFFICE
CERTIFICATE OF CORRECTION

Page 3 of 5

PATENT NO. : 5,839,153
DATED : November 24, 1998
INVENTOR(S) : Sung-Chul Ahn

It is certified that error appears in the above-identified patent and that said Letters Patent is hereby corrected as shown below:

In the drawings, Sheet 2, FIG. 2(A) should appear as follows:

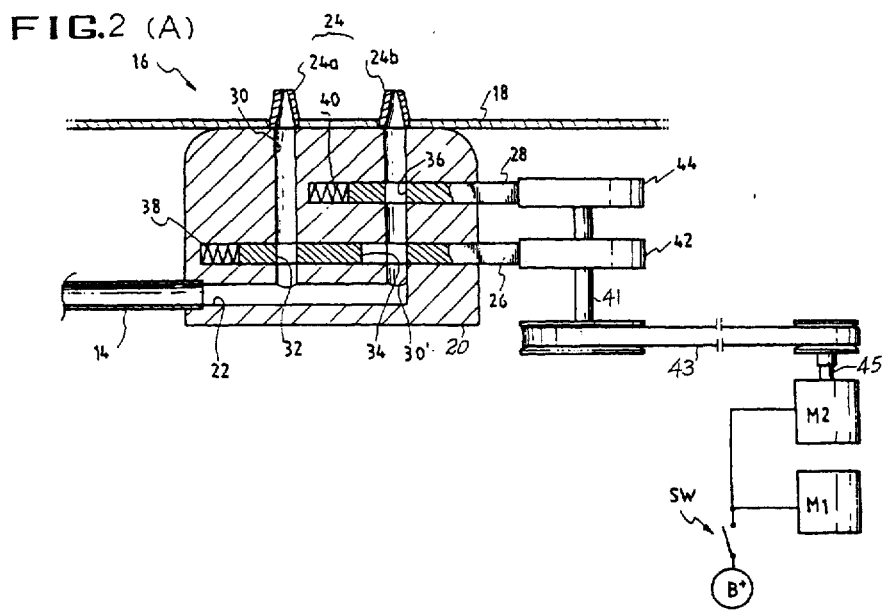

UNITED STATES PATENT AND TRADEMARK OFFICE
CERTIFICATE OF CORRECTION

Page 4 of 5

PATENT NO. : 5,839,153
DATED : November 24, 1998
INVENTOR(S) : Sungchul Ahn

It is certified that error appears in the above-identified patent and that said Letters Patent is hereby corrected as shown below:

In the drawings, Sheet 3, FIG. 2(B) should appear as follows:

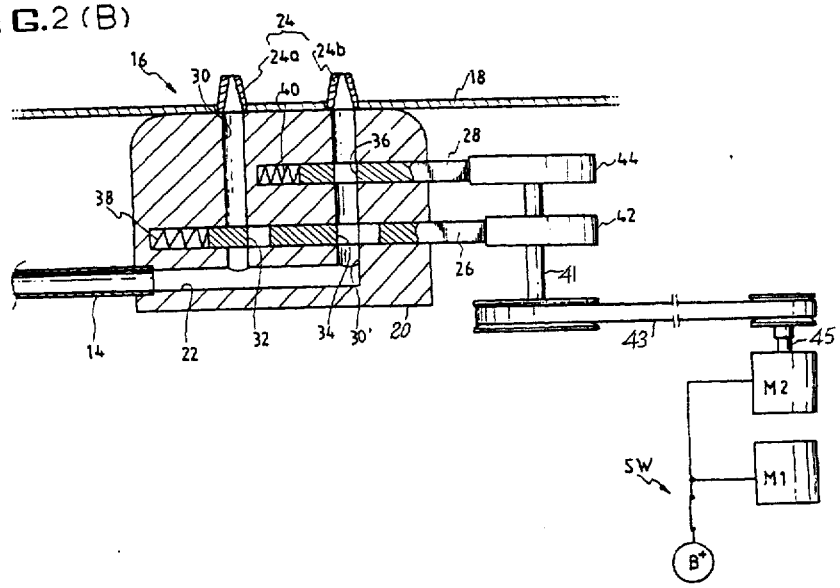

UNITED STATES PATENT AND TRADEMARK OFFICE
CERTIFICATE OF CORRECTION

PATENT NO. : 5,839,153
DATED : November 24, 1998
INVENTOR(S) : Sungchul Ahn

It is certified that error appears in the above-identified patent and that said Letters Patent is hereby corrected as shown below:

In the drawings, Sheet 4, FIG. 2(C) should appear as follows: